2 Sheets--Sheet 1.

C. BLATTNER.
Permanent Rolls for Troops.

No. 152,591. Patented June 30, 1874.

FIG. 1.

WITNESSES
Walter Allen
Henry Tamer

INVENTOR
Conrad Blattner
By Knight Bro. Attorneys

C. BLATTNER.
Permanent Rolls for Troops.
No. 152,591. Patented June 30, 1874.
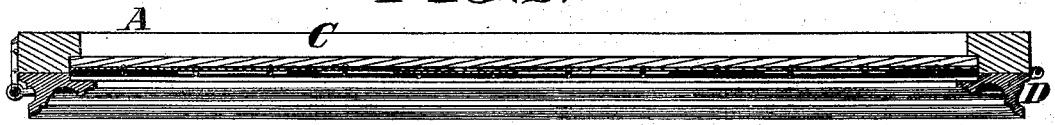

UNITED STATES PATENT OFFICE.

CONRAD BLATTNER, OF LITTLE ROCK, ARKANSAS.

IMPROVEMENT IN PERMANENT ROLLS FOR TROOPS.

Specification forming part of Letters Patent No. 152,591, dated June 30, 1874; application filed June 15, 1874.

*To all whom it may concern:*

Be it known that I, CONRAD BLATTNER, of the city of Little Rock, and county of Pulaski, in the State of Arkansas, have invented a new and useful Permanent Roll for Troops, &c., of which the following is a specification:

This invention relates to means for recording, reporting, and indicating the condition and employment of the individual members of a company or detachment of troops or police. The invention consists in the employment or use of one or more tablets divided into vertical columns, with lines extending horizontally across the same, and cards or slips of paper, or other material, furnished with the names of the members, and adapted to slide on the said horizontal lines, and to be supported in any one of the several vertical columns. The vertical columns represent different conditions and duties of the men, and the series is preferably divided into sections representing, respectively, "present" and "absent." One column in "present" represents men available for duty. When a man is assigned to duty his card is moved to the column representing the same; or, if he be granted a leave, his card is removed farther into the "absent" section of the series under this head. The condition or employment of each man is thus represented to the eye, so that in a moment (at a single glance) the commanding officer or other responsible or interested person having access may see the exact condition of the force. The work of preparing daily reports and of detailing men is by this means greatly diminished, and less skill is required in the officer in charge to secure reliable records. An adjustable calendar of any approved form may be combined with the apparatus, the same to be set at the time of making the daily change in the roll, so as to indicate the date to which the record has been corrected. The names of the commanding officers of the company or detachment, and such other names as may be required at the head of the roll, and of the respective columns, may be written, or printed on removable cards to facilitate changing these. In a preferred form the roll is framed and protected by a glass door, so as to be adapted to hang on a wall in convenient position. In another form the apparatus consists of a book of convenient size, or is adapted to fold in book form. The apparatus in the latter shape is peculiarly adapted, and intended for the use of first sergeants of military companies, who require to keep a separate account, and one less extended than the hanging roll is intended for. The name cards or slips are shifted when changes occur by the quickest and most simple manipulation, and the changes are reported or indicated at once, and without using any kind of stationery.

Figure 1 is a face view of a company roll illustrating this invention. Fig. 2 is a horizontal section on the line 2 2, Fig. 1. Fig. 3 is a face view of the roll in book form. Fig. 4 is an elevation of an instrument used in shifting the name-cards.

The foundation of this apparatus consists of a tablet or tablets, A, which may be of cardboard or other suitable material. The face of each tablet is divided into several uniform vertical columns, which are formed by rack-strips $z$. The spaces or loops in the rack-strips are horizontally in line with each other, and are of uniform dimensions. The same may consist of cords or tapes attached at proper points to form the spaces or loops, or they may be formed in any other approved way. The face of the tablet is divided vertically by horizontal lines $y$, extending through the points of attachment of the rack-strips, so that the spaces between these lines shall correspond with the spaces or loops in the rack-strips. Said spaces are adapted to accommodate narrow cards or strips $x$ of sufficient length to receive the names, which they support in any of the vertical columns. These cards or strips may be of the same material as the tablets, when this is some thin material, such as card-board or sheet metal. The cards are provided with the names of the men constituting the company or detachment for which the roll is intended, each card bearing the name of one man, and the cards of the enlisted men of a military company or detachment are numbered consecutively, to facilitate keeping the record, the numbers corresponding with those in the books of the company or detachment. The vertical columns represent the conditions and duties of the respective men, and may be likewise numbered to facilitate recording these conditions and duties. The series of these columns is preferably divided into two sections, representing, respectively, "present" and "absent." By sliding the cards or slips $x$ horizontally into different columns the names borne by the respective cards are made to appear under the proper heads to indicate the condition or employment of the individuals. To facilitate thus sliding the cards their ends are preferably tapered or rounded, as shown, and an instrument, B, Fig. 4, is provided having a sharp point, by means of which the front or leading end of any card may be readily taken hold of and guided into and through one or more rack-strips until the card is in proper position. In one preferred form of the apparatus a single large tablet, A, is mounted in a frame, C, of proper size, and the face of this frame is provided with a door, D, hinged at one edge, and provided at the opposite edge with a suitable fastening, this door having a glass panel of sufficient size to expose the record. In this form the apparatus is intended to be hung on a wall in convenient position, and is provided with eyes $w$, or their equivalent, for this purpose. Referring to the illustration of this form of the apparatus represented in Figs. 1 and 2 of the drawing, $v$ represents the name of the company or detachment, as printed or painted on the face of the tablet; $u$ $u^2$ $u^3$, cards bearing the names of the commanding officers, and $t$ a card bearing a date, these cards being all removable to provide for changing the same. $s$ represents a single long card or strip bearing the captions of the several columns.

The first column in this illustration is used to contain the official titles of individuals, so as to indicate their rank. The next column beginning the record, and numbered 1 in the section "present," represents men available for duty. Column 2 in "present" represents men on guard. Column 3 represents men on extra duty; 4, on daily duty; 5, sick; 6, under arrest or in confinement. In the section marked "absent," column 1 represents men on detached service; column 2, absent with leave or on furlough; 3, absent without leave or unaccounted for, and 4, deserted. The same number of columns may be made to represent other conditions and duties, or a greater or less number of columns may be employed with proper captions for the particular use intended, without departing from this invention. The captions are printed or written on a removable card or slip, $s$, in the illustration, to provide for readily changing them, and each caption may be on a separate slip to lessen this work. Caption-cards $r$ may also be introduced with the name-cards to divide the same, as illustrated.

In a second form of the apparatus the tablets A constitute the leaves or some of the leaves of a book, which may be adapted to be carried in the pocket. The apparatus in this shape is represented in Fig. 3, and differs from the form already described merely in details, and like letters of reference indicate corresponding parts. In the illustration the title and heading are omitted from the roll proper, as these may be readily written on the first page of the book. The caption-cards $r$ take the place of the rank column, and the record is condensed into four columns—three for "present" and one for "absent." The first column in "present" represents men for duty and roll-calls; the second, men on guard or on extra or daily duty, and the third column, men sick, under arrest, or in confinement. The "absent" column represents all those on detached service or absent with or without leave. This form of the apparatus is primarily intended for the use of first sergeants, and is thus represented in the illustration. In a still more compact and portable form for the use of first sergeants, commissioned officers, and others, the roll may have but two columns, representing, say, "present" and "absent," respectively.

Such names as those of transferred, discharged, or deceased soldiers, or those sentenced to military prison, will be taken from the roll by removing their cards, and cards bearing the names of those who take their places will be introduced, such new men receiving the same company numbers as their predecessors. At roll-calls the officer will have the names to be called, and none others, in one column, ("for duty and roll-calls,") and when a man is absent he can readily indicate it by displacing his card—say one-half its length. From the roll, as thus changed, oral or written reports can be made, and the cards of absentees may then be transferred to the column indicating "absent without leave," and afterward into the column indicating "under arrest," or as the case may require.

The following is claimed as new, namely:

A permanent roll, consisting of one or more tablets, A, divided into vertical columns by rack-strips $z$, with independent cards or slips $x$, bearing individual names, and adapted to slide horizontally into and out of the respective vertical columns, substantially as herein described, for indicating the condition or employment of the respective members of a company or detachment of troops, for example, in the manner set forth.

CONRAD BLATTNER.

Witnesses:
JAS. L. EWIN,
WALTER ALLEN.